Patented Oct. 19, 1954

2,692,184

UNITED STATES PATENT OFFICE 2,692,184

SCOURING OF WOOL AND RECOVERY OF WOOL GREASE FROM WOOL SCOURING LIQUOR

Samuel Cabot, Boston, and George Cohen, Lawrence, Mass., assignors to Pacific Mills, Lawrence, Mass., a corporation of Massachusetts No Drawing. Application April 9, 1953,
Serial No. 347,846

11 Claims. (Cl. 8—139)

This invention relates to the scouring of wool with aqueous media containing detergents and more particularly to an improved scouring process and an improved process for the recovery of wool grease from the spent scouring liquor.

Wool scouring is carried out, as one of the first steps in the processing of raw wool, for the purpose of removing grease, dirt, suint salts, protein matter, and other impurities from the wool. A widely used scouring process employs, as the scouring medium, water containing anionic or non-ionic detergents and alkalis. A representative process of this type is carried out in a series of four vessels, called "bowls," known as a "wool scouring train." The wool is scoured in the first and second bowls at about 120° F. with an aqueous solution of soap, or a synthetic detergent, and alkali. The alkali is usually sodium or potassium carbonate. The detergent and alkali are added continuously or intermittently to these bowls. The third and fourth bowls are essentially the rinsing bowls in which the wool is rinsed free of detergent and alkali. The spent liquor is thereafter treated to recover wool grease, a valuable product, therefrom, and is ultimately discarded, as by dumping it into a river, with or without treatment to reduce its contaminating effect on the stream, depending on local regulations. Such treatment when required is expensive, with little if any compensating advantage to the mills.

In the scouring process, which is continuous for a period of days, the soaps in the liquor gradually build up in concentration from reaction between the soda ash and small amounts of free fatty acids in the wool grease. As those soaps increase they require so-called builders to improve their detergency by causing the soap molecules to congregate into micellae, in which state they are much more effective detergents. It is usual mill practice for this purpose to add from time to time certain amounts of soda ash.

There are three main methods of recovering grease from aqueous scouring liquor in use on a commercial basis. These are the centrifuging process, the acid cracking process and the process based on precipitation by formation of lime soaps.

In the centrifugal process, established practice is to pass the spent scouring liquor at temperatures below the boiling point of water through a centrifuge and to pass the concentrated grease from this through a super centrifuge to remove the small amount of moisture which it still contains. This process removes only a small part, seldom more than one-third, of the grease from the liquor, the remainder being so finely emulsified that it will not separate by available centrifugal force. The presence of colloidally dispersed lime or other heavy metal salts or hardness in the spent scouring liquor, introduced from the suint or as hardness of the water, inhibits separation of the grease and causes such separation as takes place to be especially wet grease with occluded scouring liquor, difficult and wasteful to dry (separate) by super centrifugal action.

It has been customary to attempt to render this hardness harmless by addition of certain expensive sequestering agents to form metal chelates with the heavy metals.

These heavy metal salts tend to build up in the liquor throughout the period the liquor remains in the scouring train.

The acid cracking process in which the liquor is treated with sulfuric acid, followed by filtration and removal of the grease from the filter cake, removes most of the grease from the scouring liquor but in the subsequent processing some 45 to 60% of the grease is lost. The grease so produced has an undesirably high fatty acid content and is inferior in quality to that produced by the centrifuging process. The liquor left after treatment is not suitable for re-use in the scouring train because of its high acidity.

The method based on precipitation by calcium to form metallic soaps also requires filtration and removal of the grease from the filter cake. While it removes much of the grease from the scouring liquor, it requires the use of a large number of storage tanks and again much of the grease is lost in the filter cake. The liquor after treatment is not suitable for re-use in wool scouring without further treatment.

Thus the methods of grease recovery heretofore in use either give a poor yield or are expensive to carry out due to labor costs and costs of treating materials, or produce an inferior quality of wool grease and/or a low recovery, or a clarified liquor which is not suitable for re-use in the scouring of wool without further treatment. All of them leave a waste liquor which is polluting if dumped directly into a stream.

It is an object of the present invention to provide a method of recovering a further, larger, and still relatively high-grade grease fraction and to revivify the used scouring solution for still further employment as a scouring medium.

Another object is to provide such a recovery process which will give a high yield of recovered wool grease with a minimum number of operations.

Another object is to increase the amount of wool grease recovered from wool scouring liquors without decreasing the quality of the wool grease.

Another object is to provide a recovery process in which the liquor is revivified for further use in scouring.

Another object is to provide an improved scouring process in which the revivified residual liquor from the grease recovery step is recycled to the scouring train without further treatment.

Another object is to obtain a waste liquor as an end product which is much less polluting if dumped directly into a stream due to its lower biochemical oxygen demand, grease content and suspended solids.

Another object is to obtain a waste liquor as an end product which is much more amenable to treatment in a waste disposal plant, with a resultant decrease in the size and cost of the waste treatment plant needed for adequate treatment.

When wool is scoured in aqueous anionic or nonionic detergents in a system of pH above 8 the materials held in the aqueous system appear to be so held to different degrees in the following order of decreasing solubility or emulsifiability.

1. Inorganic salts
2. Proteins
3. Organic salts
4. Oxidized (discolored) esters and higher alcohols
5. Unoxidized esters and higher alcohols The result is that light-colored, substantially pure odorless and neutral esters and alcohols separate first (as by centrifugal action). This material has the highest value and can be obtained by simple centrifugal treatment of the used liquor. The residual liquor is then available for further scouring and centrifuging. The liquor, however, can only be re-used a limited number of times. The recovery of the high-grade grease as described above is relatively small.

Our process for the recovery of wool grease from wool scouring liquors comprises adding to the spent liquor a certain critical amount of an ionizable salt which will not form an insoluble reaction product with the usual compounds found in spent wool scouring liquor, e. g., proteins, inorganic salts including calcium salts, fatty esters and higher alcohols, anionic or non-ionic detergents and/or soap, thereafter maintaining the liquor at an elevated temperature until the grease-water emulsion reaches a certain critical condition in which it begins to, but does not, break, as indicated by certain tests which will be described, but without salting out the proteins, soaps or other detergents present in the liquor at this stage, thereafter allowing the liquor to stand quietly for a sufficient time to remove hardness due to lime or other heavy, metal salts, and finally separating grease from the liquor by centrifugal treatment. The salt we have found can be added in amount sufficient to cause the emulsion to begin to break after heating a reasonable length of time, but insufficient to cause salting out of proteins, detergents or soaps.

In the practice of the invention, liquor taken directly from the scouring bowls may be passed through a centrifuge to remove any separable grease, desirably first allowing it to stand and settle. This primary centrifugal treatment may be omitted, but we prefer to include it as the fraction thus obtained is of higher quality but the total yield is not decreased. The residual liquor from the primary centrifuge (or liquor from the scouring train) is conducted to a storage tank where it is heated to the boiling point. The salt is then added, either as a saturated solution or a solid. Suitable salts are water-soluble ionizable salts selected from the class consisting of the alkali metal or ammonium salts or inorganic mineral acids or of organic acids containing fewer than 3 carbon atoms. We prefer common salt, sodium chloride, as the salt. Other suitable salts, for example, are sodium thiocyanate, ammonium acetate, borax, ammonium dichromate, and the chlorides, sulfates, carbonates or nitrates of sodium, potassium or ammonium.

The liquor containing the salt is heated until a point is reached at which the grease emulsion begins to, but does not, break. At this critical point the apparent color of the solution darkens. Usually the apparent color changes from a tan to a coffee brown. Prior to this critical point, a spot test of the liquor on filter paper will give a ring of uniform density without an outside ring. When this critical point has been reached, a spot test will show an outside clear aqueous ring with a dark center. This point is usually reached in 15 minutes, more or less, at the boil when sodium chloride is used, but will vary with the liquor and the temperature.

The emulsion in this critical condition has not actually been broken. At this point there is no "salting out" of the soaps, detergents or proteins. The grease emulsion has greatly coarsened without any separation of free grease as determined by analysis. Liquors brought to this critical condition have been observed for 64 hours while standing, without any separation of grease, as determined by analysis.

The scouring liquor, now at the critical point characteristic of our process, is held in the tank and allowed to settle for longer than about 4 hours. The result of this settling step is that the amount of moisture in the grease subsequently separated in the first subsequent centrifugal treatment is sufficiently low that the grease lends itself readily to clarification by further centrifugal treatment. Our settling step acts to drag down the total hardness due to colloidally dispersed lime or other heavy metal salts, reducing it from approximately 300 parts to 90 parts per million.

Following this settling step, the liquor is subjected to a centrifugal treatment to separate wool grease therefrom. Conventional centrifugal equipment may be used for this purpose. The amount of grease recovered is usually 2 to 2½ times that which could be recovered from the liquor by a simple centrifugal treatment without our described pre-treatment. The grease recovered is of high quality.

We have found that the amount of the salt used in the above procedure renders spent liquor so processed suitable for further use in scouring wool and usually without immediate further additions of soda ash. That is, the spent liquor is revivified, the salt acting as a builder. Accordingly in our improved scouring process, all or any desired part of the clarified liquor from the centrifugal separation step is returned to the scouring train without further treatment. The spent liquor left from our recovery process is characterized by a much lower capacity to pollute or contaminate a stream into which it is dumped. Thus in some instances the waste liquor may be discharged directly to a stream where this would not be permitted if prior processes were used. If the standards set by the local regulations are such as to require treatment in a waste disposal plant even when our process is used, still the cost of such treatment is much less, as contrasted with the cost of adequately treating waste liquor from conventional recovery processes.

The following examples are given as illustrative of our invention. It is to be understood, however, that the invention is not limited to the details set forth in these examples.

*Example I*

About 11,000 gallons of spent wool scouring liquor were withdrawn from the first bowls of three wool scouring trains and pumped into a settling tank. This liquor had the following composition:

2.1% grease;
22,000 parts per million biochemical oxygen demand;
16,000 parts per million suspended solids.

Three thousand pounds of sodium chloride were added. The liquor was boiled until it changed in color from tan to a coffee brown and a drop test on filter paper showed a dark center with light outside rings. This critical point was reached in about 15 minutes. The liquor was then allowed to stand quietly in the tank for eight hours and then passed through conventional centrifugal grease recovery equipment to separate the grease therefrom. 900 lbs. of high quality grease, of the following analysis, were recovered, in contrast to the 200 to 300 pounds which would be recovered from such a liquor by conventional processes.

| | | |
|---|---|---|
| Moisture | percent | 1.6 |
| Melting point | °C | 39 |
| Ash | percent | .03 |
| Free fatty acids | do | 0.4 |
| Iodine value | do | 22 |
| Color N. P. A | do | 2.5 |

The effluent scouring liquor discharged from the grease plant had the following composition:

0.9 grease;
8000 parts per million biochemical oxygen demand;
3000 parts per million suspended solids.

If treated by conventional methods, the liquor would have the following composition:

1.4 to 1.6% grease;
12,000 to 18,000 parts per million biochemical oxygen demand;
5,000 to 6,000 parts per million suspended solids.

In such conventional methods, the clarified liquor would ordinarily be discarded. The clarified liquor of this example, was, however, found to be suitable for further use in scouring wool without addition of soda ash or other "builder," and was in part returned to the first bowl of and scouring train and used for scouring additional raw wool, and in part dumped directly into the Merrimac River. Further, as is indicated by the data given, the liquor is much less polluting than liquor from a conventional recovery process at the same stage. If it were necessary, because of local regulations, to treat the liquor in a waste disposal plant before dumping, a much less costly plant, and procedure, would be required.

*Example II*

About 11,000 gallons of spent wool scouring liquor were withdrawn from the first bowls of three wool scouring trains and pumped into a settling tank. The liquor had the following composition:

2.2% grease;
22,000 parts per million biochemical oxygen demand;
13,400 parts per million suspended solids.

This liquor was allowed to stand quietly in the tank for eight hours and then passed through conventional centrifugal grease recovery equipment. 350 pounds of high-quality grease of the following analysis were recovered.

| | | |
|---|---|---|
| Moisture | percent | 1.8 |
| Melting point | °C | 39 |
| Ash | percent | 0.03 |
| Free fatty acids | do | 0.3 |
| Iodine value | do | 35 |
| Color N. P. A | do | 2.1 |

The effluent scouring liquor discharged from the grease recovery equipment had the following composition:

1.7% grease;
17,000 parts per million biochemical oxygen demand;
4,200 parts per million suspended solids.

3,000 pounds of sodium chloride was added to this liquor and it was pumped into a tank. The liquor was boiled until it changed in color from tan to a coffee brown, and a drop test on filter paper showed a dark center with light outside rings. This critical point was reached in about 15 minutes. The liquor was then allowed to stand quietly in the tank for eight hours and then passed through conventional centrifugal grease recovery equipment to separate the grease therefrom. 800 pounds of grease of the following analysis was recovered.

| | | |
|---|---|---|
| Moisture | percent | 1.2 |
| Melting point | °C | 40 |
| Ash | percent | 0.05 |
| Free fatty acids | do | 0.4 |
| Iodine value | | 22 |
| Color N. P. A | | 2.5 |

The effluent scouring liquor discharged from the grease plant had the following composition:

1.1% grease;
12,000 parts per million biochemical oxygen demand;
4,000 parts per million suspended solids.

This effluent, like the effluent of Example I, was suitable without further treatment for further use in scouring wool.

It is not necessary to add the salt at an elevated temperature. However, adding it at an elevated temperature insures that the salt is rapidly dissolved, and we prefer this practice.

The quantity of salt used may be varied. When sodium chloride, our preferred salt, is used, it is effective in amounts between about 2% and 13% of the weight of the total liquor, varying with different liquors. The optimum amount appears to be about 2% to 4% of the weight of the total liquor. When other salts are to be used, they are used in an amount equivalent in cationic effect to the specified amounts of NaCl. The amount necessary for a particular salt with a particular liquor can readily be determined by a simple experimental addition of the salt.

The duration of the settling step following the heating step should be long enough to permit sufficient settling of lime or other heavy metal salts to facilitate subsequent centrifugal separation of the wool grease. We have found that more than about 4 hours settling is necessary and that periods of 8 to 18 hours give good results. Some further improvement is obtained with longer settling periods even up to as much as 65 hours. Still longer periods are not objectionable, aside from the cost and delay involved. Conveniently, the length of the settling period may be set to fit in with changes in work shifts or otherwise adapted to the routine of the mill. The settling step preceding the first, optional, centrifugal treatment, when employed, may be of similar duration.

We prefer to heat the liquid to the boiling temperature, or above, but lower temperatures may be used. However, we have found that the higher the temperature, the shorter the time of heating, after the salt has been added, required to reach the critical point.

The present application is a continuation-in-part of our prior application Serial No. 182,126 filed August 29, 1950.

We claim:

1. The method of scouring wool which comprises immersing raw wool containing the usual impurities, including wool grease, proteins and inorganic salts, in a bath of scouring liquor comprising water, a detergent and an alkali, heating the liquor to remove wool grease, inorganic salts and protein impurities from the wool fiber, withdrawing liquor from said bath and adding to said withdrawn liquor a water soluble ionizable salt selected from the class consisting of the alkali metal and ammonium salts of the mineral acids and of organic acids containing fewer than 3 carbon atoms, said salt being added in an amount sufficient to cause building of the soaps but insufficient to cause salting out of proteins, detergents or soaps from the liquor, heating said liquor until its color darkens and a spot test of the liquor on filter paper gives an outside clear ring with a dark center, thereafter allowing the liquor to stand and settle for more than about four hours to remove hardness due to lime and other heavy metal salts, and thereafter separating wool grease from the liquor by centrifugal treatment.

2. The method of claim 1 in which residual liquor from said centrifugal treatment is returned directly to said scouring bath without further treatment, and wool is scoured therein.

3. The method of claim 1 in which residual liquor from said centrifugal treatment is discharged to a stream.

4. The method of claim 1 wherein the salt is sodium chloride.

5. The method of claim 4 wherein the sodium chloride is added in an amount between about 2% and about 4% of the total weight of the liquor.

6. The process for the recovery of wool grease from a spent aqueous wool scouring liquor containing proteins, inorganic salts, a detergent, alkali and fatty esters and higher alcohols, which comprises adding to the liquor a water-soluble ionizable salt selected from the class consisting of the alkali metal and ammonium salts of the mineral acids and of organic acids containing fewer than 3 carbon atoms, said salt being added in an amount sufficient to cause building of the soaps but insufficient to cause salting out of proteins, detergents or soaps from the liquor, heating said liquor until its color darkens and a spot test of the liquor on filter paper gives an outside clear ring with a dark center, thereafter allowing said liquor to stand and settle for more than about four hours to separate lime and other heavy metal salts, and thereafter separating wool grease from the liquor by centrifugal treatment.

7. The process of claim 6 in which residual liquor from said centrifugal treatment is returned to a wool scouring train without further treatment.

8. The process of claim 6 in which residual liquor from said centrifugal treatment is discharged to a stream.

9. The process of claim 6 wherein the salt is sodium chloride.

10. The process of claim 9 wherein the sodium chloride is added in an amount between about 2% and 4% of the total weight of the liquor.

11. In the recovery of wool grease from a spent aqueous wool scouring liquor containing proteins, inorganic salts, a detergent, alkali and fatty esters and higher alcohols, the process which consists in passing the liquor through a centrifuge to remove separable grease, then adding to the residual liquor a water-soluble ionizable salt selected from the class consisting of the alkali metal and ammonium salts of the mineral acids and of organic acids containing less than 3 carbon atoms, said salt being added in an amount sufficient to cause building of the soaps but insufficient to cause salting out of proteins, detergents or soaps from the liquor, heating said liquor until its color darkens and a spot test of the liquor on filter paper gives an outside clear ring with a dark center, thereafter allowing said liquor to stand and settle for more than about four hours, to separate lime and other heavy metal salts, and thereafter separating wool grease from the liquor by centrifugal treatment.

References Cited in the file of this patent

UNITED STATES PATENTS

| Number | Name | Date |
|---|---|---|
| 14,037 | Ward, Jr. | Jan. 1, 1856 |
| 1,070,435 | Felizat | Aug. 19, 1913 |
| 1,110,277 | Abbott, Jr. | Sept. 8, 1914 |
| 1,232,913 | Hagemann | July 10, 1917 |
| 1,247,782 | Ayres, Jr. | Nov. 27, 1917 |
| 2,183,142 | Mackenzie | Dec. 12, 1939 |
| 2,421,094 | Totney | May 27, 1947 |